United States Patent
Reuter et al.

(12)

(10) Patent No.: US 6,235,812 B1
(45) Date of Patent: May 22, 2001

(54) WATER-DISPERSIBLE EPOXY RESINS MODIFIED WITH VINYL ACETATE COPOLYMERS

(75) Inventors: Hardy Reuter; Walter Jouck; Günther Ott, all of Münster; Karl-Heinz Grosse Brinkhaus, Nottuln, all of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/180,350

(22) PCT Filed: Apr. 22, 1997

(86) PCT No.: PCT/EP97/02027

§ 371 Date: Dec. 11, 1998

§ 102(e) Date: Dec. 11, 1998

(87) PCT Pub. No.: WO97/42254

PCT Pub. Date: Nov. 13, 1997

(30) Foreign Application Priority Data

May 8, 1996 (DE) ............................... 196 18 379

(51) Int. Cl.[7] ............................ C08K 3/20; C08L 23/08; C08L 31/04; C08L 63/02
(52) U.S. Cl. .......................................... 523/412; 523/410
(58) Field of Search ..................... 523/412, 410

(56) References Cited

U.S. PATENT DOCUMENTS

| Re. 34,766 | * 10/1994 | Merz et al. ........................... 523/411 |
| 3,098,054 | 7/1963 | Rosenberg ............................. 260/41 |
| 4,108,819 | * 8/1978 | Oyamada et al. ..................... 523/402 |
| 4,477,609 | * 10/1984 | Aluotto et al. ....................... 523/407 |

FOREIGN PATENT DOCUMENTS

| 26 50 611 B2 | 11/1976 | (DE) . |
| 26 50 611 B2 | 5/1977 | (DE) . |
| 35 187 32 A1 | 11/1986 | (DE) . |
| 35 18770 A1 | 11/1986 | (DE) . |
| 39 40 782 A1 | 6/1991 | (DE) . |
| 0 040 090 B1 | 5/1981 | (EP) . |
| 052831 | 6/1982 | (EP) . |
| 0 259 181 A2 | 3/1988 | (EP) . |
| 0 262 069 A2 | 3/1988 | (EP) . |
| 012463 | 6/1990 | (EP) . |
| 0 433 783 A1 | 6/1991 | (EP) . |
| 0 505 445 B1 | 9/1992 | (EP) . |
| 0 638 606 A1 | 8/1994 | (EP) . |
| 53-94346 | * 8/1978 | (JP) . |
| 6-247820 | 2/1994 | (JP) . |
| 310 952 | 6/1970 | (SU) . |
| 436 890 | 4/1972 | (SU) . |
| 551297 | * 4/1977 | (SU) . |
| 661 637 | 5/1979 | (SU) . |
| 998 592 | 2/1983 | (SU) . |

OTHER PUBLICATIONS

Lee and Neville, Handbook of Epoxy Resins, McGraw–Hill Book Company, New York, NY, 1967, pp. 9–1 to 9–3.*

* cited by examiner

Primary Examiner—Robert E. L. Sellers

(57) ABSTRACT

The invention relates to a process for preparing a binder for electrodeposition coating compositions comprising providing:

(A) from 1 to 99.9% by weight of an epoxy resin and
(B) from 0.1 to 99.% by weight of a copolymer of vinyl acetate and at least one further component selected from the group vinyl alcohol, alkyl-vinyl acetal and ethylene, characterized in that components (A) and (B) of the binder are mixed intensively in a solvent or in the melt before being used in the coating composition, preferably in the presence of epoxy ring-opening catalysts.

14 Claims, No Drawings

WATER-DISPERSIBLE EPOXY RESINS MODIFIED WITH VINYL ACETATE COPOLYMERS

FIELD OF THE INVENTION

The invention relates to water-dispersible synthetic resins based on mixtures of copolymers (B) comprising vinyl acetate units and also at least one unit selected from the group of vinyl alcohol, vinyl acetal and ethylene units, with epoxy resins (A) as binders, in particular for electrodeposition coating baths. Coatings which comprise these synthetic resins feature excellent corrosion protection, especially at edges of substrates, and outstanding resistance to mechanical stress, for example stone chipping.

BACKGROUND OF THE INVENTION

The electrodeposition coating is a sufficiently known process for coating the surface of electrically conducting substrates (compare in this context, for example: Glasurit Handbuch Lacke und Farben, Curt R. Vincentz Verlag, Hanover, 1984, Pages 374 to 384 and pages 457 to 462, and DE-A-35 18 732, DE-A-35 18 770, EP-A-0 040 090, EP-A-0 012 463, EP-A-0 259 181, EP-A-0 433 783 and EP-A-0 262 069). The process is employed to coat metal objects, especially for priming automobile bodies, or else for coating conductive plastics.

The coating materials used in the course of electrodeposition coating generally comprise, as binders, amino- or carboxyl-containing synthetic resins, dispersibility in water being obtained by the neutralization of the amino or carboxyl groups. Special grinding resins, and optionally further, non water-dispersible constituents, such as polymers, plasticizers, pigments, fillers, additives and auxiliaries, are further possible constituents of the electrodeposition coating materials. The crosslinkers employed in the electrodeposition coating materials are either non-dispersible in water or can be water-dispersible, the electrodeposition coating materials being externally crosslinking or else autocrosslinking or being curable by condensation.

Through modification of the binders, selection of the crosslinkers and variation in the composition of the constituents of the electrodeposition coating material, the properties of the coating, for example corrosion protection, adhesion and evenness, are influenced. There are thus known, in particular, electrodeposition coating materials where polymer microparticles or polymer powders—suspended or incorporated by dispersion—are added with the aim of favourably influencing the corrosion protection, especially at edges, the adhesion, especially the impact strength, and the evenness.

Thus it is recommended in EP-A-0 259 181 to overcome the heightened susceptibility to corrosion observed at edges of the coated substrate and caused by an insufficiently thick coating film by adding polymer microgels, the polymer microparticles being characterized by a softening point which is at least 10 degrees C above the bath temperature, by a solubility parameter which differs by not more than 1.0 from the solubility parameter of the depositable synthetic resin, by a refractive index which deviates by 0.02–0.3 from the refractive index of the depositable synthetic resin, and by a crosslinking density of 0.01-5.05 mmol/g, and where, for example, poly(meth)acrylate copolymers in combination with ethylenically unsaturated vinyl compounds can be part of such microgels.

DE-B-26 50 611, EP-A-0 052 831, DE-A-39 40 782, EP-A-0 433 783, SU-A-436890, JP-A-53094346, JP-A-79028410 and JP-A-0624820 describe electrodeposition coating compositions with polymer powders which can be suspended or incorporated by dispersion and which are predominantly free from ionic groups, optionally are able to melt in the course of stoving, and are noncrosslinked or crosslinked, the coating compositions additionally comprising water-dispersible synthetic resins that are typical for electrodeposition coatings. The particle sizes of such polymer powders can in this case markedly exceed the particle sizes of the water-dispersible synthetic resins of known electrodeposition coating materials: the average particle diameter in JP-A-0624820 is from 1 to 50 micrometers, and in DE-A-39 40 782 or EP-A-0 433 783 is from 0.1 to 100 micrometers.

Examples of such pulverulent polymers are polyesters, polyolefins, polystyrene, poly(meth)acrylates, polyurethanes, polyamides, polyvinyl chloride, poly(meth)acrylonitrile, polyoxymethylene, polyvinyl alcohol, butyral resins, ethylene-vinyl acetate copolymers, acrylonitrile-styrene copolymers, acrylonitrile-styrene-butadiene copolymers, polyethylene terephthalate, polybutylene terephthalate, crosslinked urea-aldehyde, triazine-aldehyde and phenol-aldehyde resins, epoxy resins, or cellulose acetate.

In addition, SU-A-661637, SU-A-998592 and SU-A-310952 describe coatings which are formed by cataphoretic deposition of nonaqueous dispersions of polymer powders, the medium used being aliphatic alcohols, such as isopropanol, or tetrachloromethane, and it being possible to add conductive salts, such as ammonium thiocyanate. Polymer powders employed are polyvinyl butyrals.

These coatings are notable for mechanical properties, chemical stability and the properties of adhesion to metallic substrates as known for solvent-containing single-coat systems based on polyvinyl acetal.

The addition to aqueous electrodeposition coating materials of the polymer particles described in EP-A-0 259 181, DE-B-26 50 611, EP-A-0 052 831, EP-A-0 433 783, SU-A-436890, JP-A-53094346, JP-A-79028410 and JP-A-0624820 leads in many cases to improvement in the edge coverage or stone chip protection. In contrast, the corrosion protection afforded by the deposited electrodeposition coating films, especially of the edges, is inadequate despite the improved edge coverage.

Adverse side-effects of the addition of polymer powders are a worsening in the throwing power of the electrodeposition coating materials and in the adhesion to the substrate and/or to subsequent coatings, such as coating films applied over them or PVC underbody protection, impairment in the mechanical properties, such as flexibility, extensibility, fracture strength and impact strength, poorer flow properties and a drastic deterioration in evenness.

A disadvantage of the aqueous and nonaqueous formulations described in the patents EP-A-0 25.9 181, DE-B-26 50 611, EP-A-0 052 831, EP-A-0 433 783, SU-A-436890, JP-A-53094346, JP-A-79028410, JP-A-0624820, SU-A-661637, SU-A-998592 and SU-A-310952 that continues to be important is the inadequate stability of the coating materials, which have a tendency toward sedimentation. In this context, in aqueous electrodeposition coating materials there may be massive covering of the ultrafiltration membranes with coarse polymer particles.

SUMMARY OF THE INVENTION

The problem on which the present invention is based was therefore to provide coating compositions, especially aqueous electrodeposition coating materials comprising cathodically or anodically depositable synthetic resins, which materials give coating films having properties which are improved relative to the prior art.

With the target coating compositions it is the intention, in particular, to obtain coating films which owing to improved rheology give good coverage of the edges of the coated substrates, and provide coatings having good mechanical properties, such as impact toughness (in the context of good stone chip protection), in coating systems including in particular those without added pigment.

This problem is surprisingly solved by coating compositions comprising a binder component, prepared by intensive mixing in a solvent and/or in the melt of:
(A) from 1 to 99.9% by weight of an epoxy resin and
(B) from 0.1 to 99% by weight of a copolymer of vinyl acetate and at least one component selected from the group vinyl alcohol, vinyl acetal and ethylene.

Preferably, components (A) and (B) are mixed at temperatures between 15 and 250 degrees C, preferably between 70 and 200 degrees C, in the presence of epoxy ring-opening catalysts. Preferred epoxy ring-opening catalysts are tertiary amines or neutral salts.

Preferred binders are obtained by subsequent partial or complete reaction of the epoxy groups of the epoxy resin (A) that remain after the mixing operation with amino- or carboxyl-containing compounds which following the reaction with the epoxy groups can be converted to ionic groups by neutralization.

In a preferred embodiment of the invention the binder, which contains ionic groups, is dispersed in water in a further process step.

With particular preference, the resulting stable aqueous dispersions of the binder BM are employed as a constituent of electrodeposition coating materials, the component (A) of the binder in such systems preferably being an epoxy resin having an epoxide equivalent weight of between 170 and 10,000 g/eq, the epoxy resin particularly preferably being a glycidyl ether of a cyclic polyol, with very particular preference of a polyphenol, and/or its reaction product with aliphatic and/or alicyclic hydroxy compounds.

With further preference, the copolymer (B) is composed of:
(b1) from 0 to 5000 monomer units of alkylvinyl acetal of the formula I

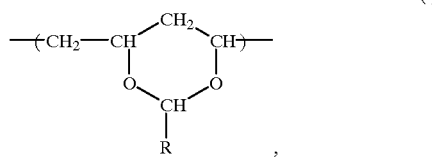

(I)

where R is a $C_1$ to $C_{11}$ alkyl radical,
(b2) from 3 to 6500 monomer units of vinyl acetate,
(b3) from 0 to 12,500 monomer units of vinyl alcohol and
(b4) from 0 to 20,000 monomer units of ethylene.

The coating materials comprising the binder, especially electrodeposition coating materials, are preferably employed for producing impact-resistant coating systems, especially stonechip-resistant coating systems for motor vehicles, the preferably electrically conducting substrate being coated first of all with the novel coating material, subsequently with customary surfacers and finally with customary topcoats and/or clearcoats, the coating films being stoved individually or together.

Coating systems produced in such a way are notable for high stonechip protection and markedly reduced edge corrosion.

DETAILED DESCRIPTION OF THE INVENTION

Component (A) of the Binder

Epoxy resins (A) which can be used are all low molecular mass and high molecular mass polymers, provided they contain on average more than one epoxy group per molecule. Preferred epoxide compounds are those having two or more epoxy groups per molecule.

Preferred epoxides (A) are polyglycidyl ethers of cyclic polyols, where particularly preferred epoxides are polyglycidyl ethers of polyphenols, especially of bisphenol A or bisphenol F. These polyepoxides can be prepared by etherification of a polyphenol with an epihalohydrin or with a dihalohydrin, such as epichlorohydrin or dichlorohydrin, in the presence of alkalis in a manner known per se.

Examples of polyphenols are 2,2-bis(4-hydroxyphenyl) propane, 1,1-bis(4-hydroxyphenyl)ethane, 2-methyl-1,1-bis (4-hydroxyphenyl)propane, 2,2-bis(4-hydroxy-3-tert-butylphenyl)propane, bis(2-hydroxynaphthyl)methane and 1,5-dihydroxy-3-naphthalene. Examples of further cyclic polyols are cycloaliphatic polyols, such as 1,2-cyclohexanediol, 1,4-cyclohexanediol, 1,2-bis(hydroxymethyl)cyclohexane, 1,3-bis(hydroxymethyl) cyclohexane and hydrogenated bisphenol A. Furthermore, it is also possible to use alkoxylated adducts, such as ethylene oxide and propylene oxide adducts, of these alicyclic polyols and polyphenols.

As epoxy resins (A), it is additionally possible to employ polyglycidyl ethers of polyhydric alcohols such as, for example, ethylene glycol, diethylene glycol, triethylene glycol, 1,2-propylene glycol, 1,3-propylene glycol, 1,4-butylene glycol and 1,5-pentanediol.

In addition, epoxides that are obtained by epoxidation of an olefinically unsaturated alicyclic compound are suitable as epoxy resins (A). Epoxy resins (A) of this kind include diepoxides or higher epoxides and also mixtures thereof containing one or more monoepoxides. These epoxides are obtained by epoxidation of alicyclic olefins, for example with oxygen and selected metal catalysts, with per compounds, for example perbenzoic acid, with acetaldehyde monoperacetate or peracetic acid. Examples of such epoxides are 1,5-diepoxycyclooctane and isomers of cyclopentadiene dioxide.

It is likewise possible to employ epoxy resins (A) prepared by the partial epoxidation of polydienes and co-polymers thereof. By way of example mention may be made of partially epoxidized polybutadiene and polyisoprene.

Another suitable class of the epoxy resins (A) are polyglycidyl ethers of phenolic novolak resins or similar phenolic resins.

The synthesis of the epoxy resins (A) is conducted in accordance with known processes of the prior art.

In the course of the preparation of epoxy resins of the bisphenol A or bisphenol F type there takes place between the epoxy groups and the phenolic hydroxyl groups a reaction which, given the chosen catalysis, is substantially free from side reactions. To this end an epoxy resin based on bisphenol A or bisphenol F and a phenol are typically reacted in the presence of an appropriate catalyst, such as triphenylphosphine, or of a phosphonium salt, for example ethyltriphenylphosphonium iodide.

As phenols it is possible to employ monophenols and/or polyphenols, including alkyl- and alkoxy-substituted phenols. Examples of monophenols are phenol, 2-hydroxytoluene, 3-hydroxytoluene, 4-hydroxytoluene, 2-tert-butylphenol, 4-tert-butylphenol, 2-tert-butyl-4-methylphenol, 2-methoxyphenol, 4-methoxyphenol, 2-hydroxybenzyl alcohol, 4-hydroxybenzyl alcohol, nonylphenol, dodecylphenol, 1-hydroxynaphthalene, 2-hydroxynaphthalene, biphenyl-2-ol, biphenyl-4-ol and 2-allylphenol. Bisphenol A or bisphenol F, for example, are regarded as typical representatives of polyphenols. Examples of further polyphenols are 1,4-dihydroxybenzene, 1,3-dihydroxybenzene, 1,2-dihydroxybenzene, 2,2-bis(4-hydroxyphenyl)propane, 1,1-bis(4-hydroxyphenyl)ethane, 2-methyl-1,1-bis(4-hydroxyphenyl)propane, 2,2-bis(4-hydroxy-3-tert-butylphenyl)propane, 4,4-dihydroxybenzophenone, 2,4-dihydroxybenzophenone, 1,4-dihydroxynaphthalene, bis(3-hydroxynaphthyl)methane and 1,5-dihydroxy-3-naphthalene.

This can be done in the absence (separately) or, optionally, presence of aliphatic and/or cycloaliphatic hydroxyl compounds (in situ), at temperatures from 80 to 200 degrees C, preferably from 100 to 150 degrees C. Compounds suitable for reaction with aliphatic and/or cycloaliphatic hydroxy compounds are in principle all monoalcohols, diols, triols and polyols, with temperatures of from 80 to 200 degrees C being suitable, preferably from 100 to 150 degrees C.

In the case of the preferred use of the binders for cathodic electrodeposition coating materials, the incorporation of monoalcohols into the epoxy resins (A) produces binders which are notable for an additional flexibilization. In addition, the formation of thicker coating films is promoted, or, respectively, the reductions which can commonly be observed in the coat thicknesses with, simultaneously, a lower nonvolatiles content and/or a reduction in the plasticizer content are compensated.

Examples of suitable monoalcohols are methanol, ethyl, propyl, isopropyl, butyl, isobutyl, amyl, isoamyl, 2-ethylbutyl, hexyl, heptyl, octyl, 2-ethylhexyl, nonyl, 3,3,5-trimethylhexyl, isononyl, decyl, isodecyl, lauryl, isotridecyl, isohexadecyl, isooctadecyl and neopentyl alcohol, 3,7-dimethyl-3-octanol, 3-cyclohexylpropanol and 2,4-dimethylpentan-3-ol.

Likewise suitable are unsaturated monoalcohols, for example allyl alcohol, 1-buten-3-ol, 2-methyl-3-buten- 2-ol, 3-methyl-1-penten-3-ol, crotyl alcohol, 9-decen-1-ol, cinnamyl alcohol and 9-octadecen-1-ol.

Also suitable as monoalcohols are benzyl alcohol, 1-phenylethanol, 2-phenylethanol, 4-methylbenzyl alcohol, 2-phenyl-1-propanol, diphenyl carbinol and phenylmethyl carbinol, cycloaliphatic alcohols, such as cyclopentanol, cyclohexanol and 4-tert-butylcyclohexanol, ether alcohols, such as methylglycol, ethylglycol, butylglycol, methyl-, ethyl- and butyldiglycol, methyl-, ethyl- and butyltriglycol, methyl-, ethyl- and butylpolyglycol and also hexylglycol, hexyldiglycol, phenylglycol, phenyldiglycol, methoxypropanol, methoxybutanol, phenoxypropanol and phenoxybutanol, polyoxyalkylenemonools, such as monoalcohols of polyoxymethylene, of polyoxyethylene, of polyoxypropylene and of polyoxytetramethylene, for example polyoxypropylenes of designation Tegomer® H3304 (from Th. Goldschmidt AG), ethoxylated or propoxylated alkylphenols, such as TRITON® X-15, TRITON® X-35 or TRITON® X-405 (from Rohm und Haas) and PLAS-TILIT® 3060 (from BASF AG), the preferred molecular weight of such polyoxyalkylenemonools being in the range from 350 to 6000 g/mol, monofunctional oligomers with a terminal hydroxyl group, based on polybutadiene, polyisoprene, the copolymers of butadiene and isoprene, the copolymers of butadiene or isoprene with styrene, the copolymers of butadiene, isoprene and styrene, their hydrogenated or partially hydrogenated polymers, especially block copolymers of the abovementioned types, such as KRATON® HPVM 1101, 1202, KRATON® HPVM-1301 (from Shell), diols, such as preferably alkylene glycols, for example ethylene glycol, diethylene glycol, triethylene glycol, tetraethylene glycol, propylene glycol, dipropylene glycol, butylene glycol and neopentylglycol, propane-1,2-diol, propane-1,3-diol, butane-1,4-diol, butane-1,3-diol, 2-butyne-1,4-diol, hexane-1,6-diol, decane-1,10-diol, 1,4-cyclohexanediol, 1,2-cyclohexanediol, 1-phenyl-1,2-ethanediol and also tetraphenyl-1,2-ethanediol, polyoxyalkylene glycols, for example polyoxymethylene, polyoxyethylene, polyoxypropylene and polyoxytetramethylene glycols, e.g. polyoxyethylene glycol and polyoxypropylene glycol PLURIOL® E400, P900, P2000 (from BASF AG), copolymers, especially block copolymers, such as block copolymers of ethylene oxide and propylene oxide, for example PLURONIC® PE3100, PE6100 (from BASF AG), the preferred molecular weight of the polyoxyalkylene glycols being in the range from 350 to 6800 g/mol, difunctional oligomers having terminal hydroxyl groups, based on polybutadiene, polyisoprene, the copolymers of butadiene and isoprene, the copolymers of butadiene or isoprene with styrene, the copolymers of butadiene, isoprene and styrene, their hydrogenated or partially hydrogenated polymers, especially block copolymers of the types mentioned, such as ®45HT (from Metallgesellschaft AG), KRATON® HPVM-2202 or KRATON® WRC-91-102 (from Shell).

Polyfunctional aliphatic and/or cycloaliphatic hydroxy compounds are likewise suitable for preparing the epoxy resin (A), mention being made by way of example of trimethylolpropane, 1,2,6-hexanetriol, pentaerythritol, dipentaerythritol, tripentaerythritol, polypentaerythritol, methylglucoside, sucrose and reaction products thereof with ethylene oxide or propylene oxide or mixtures, for example ethoxylated or propoxylated trimethylolpropane (POLYOL® TP08, TP30; TS30 from Perstop [sic] Polyols), ethoxylated or propoxylated pentaerythritol (POLYOL® PP30, PP50, PS 50 from Perstop [sic] Polyols).

Component (B) of the Binder

As component (B) of the binder it is preferred in accordance with the invention to employ copolymers consisting of:

| (b1) from 0 to 5000 | monomers units of alkylvinyl acetal of the formula: 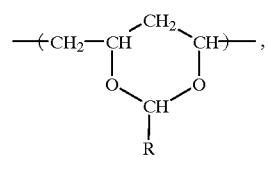 (I) where R is a C1- to C11-alkyl radical, |
|---|---|
| (b2) from 3 to 6500 | monomer units of vinyl acetate, |

| | |
|---|---|
| (b3) from 0 to 12,500 | monomer units of vinyl alcohol and |
| (b4) from 0 to 20,000 | monomer units of ethylene. |

By way of example of compounds of the formula I there may be mentioned: vinyl acetals formed by the reaction of acetaldehyde, propionaldehyde or butyraldehyde with vinyl alcohols.

Particular preference is given to copolymers (B) consisting of:

| | |
|---|---|
| (b1) from 3 to 4600 | monomer units of vinyl acetal of the formula I, |
| (b2) from 3 to 6200 | monomer units of vinyl acetate and |
| (b3) from 0 to 12,100 | monomer units of vinyl alcohol, | such as, for example, MOWITAL® grades from Hoechst AG or PIOLOFORM® grades from Wacker, e.g. MOWITAL® B 20 H. B 30 H, B 30 T or B 60 H, PIOLOFORM® BN18, BL16, BL18, FN50 or FN65, and/or

| | |
|---|---|
| (b2) from 3 to 6200 | monomer units of vinyl acetate, |
| (b3) from 0 to 12,100 | monomer units of vinyl alcohol and |
| (b4) from 3 to 18,000 | monomer units of ethylene, | for example LUPOLEN® grades from BASF AG, e.g. LUPOLEN® V3510K, or LUPOLEN® V3510K which has been subjected to alkaline partial hydrolysis with sodium hydroxide solution.

The Preparation of the Novel Binder

To prepare the binders components (A) and (B) are mixed intensively in the coating composition before the introduction of the binder. Components (A) and (B) can be mixed in a solvent common to them or in the melt of the components, the mixing temperatures preferably being between 15 and 250 degrees C, with particular preference between 70 and 200 degrees C. The mixing temperatures are chosen preferably, and especially when the components are mixed in the melt, such that there is no notable reduction in the molecular weight either of component (A) or of component (B).

Examples of suitable mixing equipment are stirred vessels or flowpipes for mixing the components (A) and (B) in a common solvent, and extruders for mixing the components in the melt.

Examples of suitable common solvents for components (A) and (B) are aromatic solvents, such as toluene, xylene or ethylbenzene, dioxane and dialkylene glycol derivatives, such as diethylene glycol dimethyl ether, diethylene glycol dibutyl ether or dipropylene glycol dimethyl ether.

When mixing components (A) and (B), it is preferred to employ epoxy ring-opening catalysts in amounts of from 0.01 to 0.8% by weight, preferably from 0.1 to 0.5% by weight, based on the mixture of (A) and (B).

As epoxy ring-opening catalysts it is preferred to employ tertiary amines or neutral salts, for example N,N-dimethylbenzylamine, N-methylmorpholine, N-ethylmorpholine, N-methylimidazole, zinc perchlorate or magnesium perchlorate.

For the use of the binders in aqueous systems it is necessary to introduce ionic groups into the epoxy resin reaction products (A). Thus it is possible by means of appropriate measures to introduce acid groups which after neutralization with amines give a water-soluble resin. For the widespread electrodeposition coating of metallic substrates, cathodic electrodeposition coating is preferably employed. In this case the resin carries positive charges. For this purpose the epoxy resin reaction product (A) is reacted with amines and the positive charges are generated by subsequent neutralization with carboxylic acids.

As amine component it is possible to employ primary, secondary and tertiary amines or mixtures of these. Primary and secondary amines can be added on directly to the epoxide ring. Tertiary amines can only be incorporated by way of a further functional group in the molecule. The amines used are preferably water-soluble. Examples of such amines are mono- and dialkylamines, such as methylamine, ethylamine, propylamine, butylamine, dimethylamine, diethylamine, dipropylamine and methylbutylamine. Also suitable are alkanolamines, for example methylethanolamine and diethanolamine. Other suitable water-soluble amines are dialkylaminoalkylamines, for example dimethylaminoethylamine, diethylaminopropylamine and dimethylaminopropylamine. It is also possible to employ ketimino-containing amines, such as, for example, the methyl isobutyl diketimine of diethylenetriamine. In the majority of cases low molecular mass amines are used, although it is also possible to employ higher molecular mass monoamines. Similarly, mixtures can be used as well. Polyamines with primary and secondary amino groups can be reacted in the form of their ketimines with the epoxy groups. The ketimines are prepared from the polyamines in a familiar way.

The amines may also contain other groups, although such groups should not disrupt the reaction of the amine with the epoxide group and should also not lead to gelling of the reaction mixture.

It is preferred to employ primary and secondary amines. The reaction of the amine with the epoxy group-containing epoxy resin reaction product (A) often takes place as soon as the precursors are mixed. However, it may also be necessary to carry out heating to elevated temperatures, for example to from 50 to 150 degrees C. Nevertheless, reactions are also possible at lower and higher temperatures.

For the reaction with the epoxy group-containing epoxy resin reaction product (A) the amount of amine used should be at least such that the resin takes on a cationic nature, i.e. such that under the influence of a voltage in the coating bath it migrates to the cathode when it has been rendered soluble by addition of an acid. The charges required for dilutability in water and electrical deposition can be generated by protonation with water-soluble acids, for example boric acid, formic acid, lactic acid, propioninc acid, preferably acetic acid. In general it is only necessary to add a quantity of acid such that the product can be dispersed in water. However, it is also possible to use so much acid that the theoretical degree of neutralization of 100% is exceeded.

A further possibility for introducing cationic groups is the reaction of epoxy resins (A) with amine salts for example salts of tertiary amines. Amine constituents of amine-acid salt are, for example, amines which can be unsubstituted or substituted as in the case of hydroxylamine, where the substituents do not disrupt the reaction with the epoxy group of the epoxy resin reaction product (A) and the reaction mixture should not gel. Preferred amines are tertiary amines, such as dimethylethanolamine, triethylamine, trimethylamine, triisopropylamine and the like.

The cathodically depositable epoxy resins (A) present in the novel electrodeposition coating materials are generally either autocrosslinking and/or are combined with a crosslinker or with a mixture of crosslinkers.

Autocrosslinkable synthetic resins are obtainable by introducing into the epoxy resin molecules (A) reactive groups which react with one another under stoving conditions. For example, blocked isocyanate groups can be introduced into hydroxyl- and/or amino-containing epoxy resins (A); under stoving conditions the former groups are unblocked and react with the hydroxyl and/or amino groups to form crosslinked coating films. Autocrosslinkable epoxy resins (A) can also be obtained by reacting a hydroxyl- and/or amino-containing epoxy resin with a partially blocked polyisocyanate containing on statistical average one free NCO group per molecule.

The Aqueous Electrodeposition Coating Materials

The aqueous electrodeposition coating materials comprising the novel binder may additionally comprise, in principle, all crosslinkers which are suitable for electrodeposition coating materials, such as, for example, phenolic resins, polyfunctional Mannich bases, melamine resins, benzoguanamine resins and also blocked polyisocyanates and compounds containing activated ester groups. Blocked polyisocyanates are preferably employed as crosslinkers. In the context of the invention it is possible to use any desired polyisocyanate in which the isocyanate groups have been reacted so that the blocked polyisocyanate formed is resistant to hydroxyl groups and amino groups at room temperature and yet reacts at elevated temperature, in general in the range from about 90 to about 300 degrees C. In the context of the preparation of the blocked isocyanates it is possible to use any desired organic di- or polyisocyanates which are suitable for crosslinking, such as, customarily, aliphatic, cycloaliphatic or aromatic isocyanates. These can also be prepolymers which are derived, for example, from a polyol, including polyetherpolyols or polyesterpolyols. The isocyanates can be blocked with all known blocking agents, such as alcohols, phenols, oximes, lactams, alkanolamines, secondary amines and aromatic alcohols, as has already been described in detail in the above-cited patent documents (DE-A-35 18 732, DE-A-35 18 770, EP-A-0 040 090, EP-A-0 012 463, EP-A-0 259 181, EP-A-0 433 783, EP-A-0 262 069).

In addition to the above-described components, the novel aqueous electrodeposition coating materials may also comprise further coating constituents which are customary per se, for example organic solvents, wetting agents, anticrater additives and also, in particular, pigments and fillers.

As pigments it is possible to employ customary pigments as fillers, for example carbon black, titanium dioxide, finely disperse silica, aluminum silicate, metal-effect pigments, organic and inorganic color pigments and also anticorrosion pigments, such as lead compounds or chromate compounds. The pigments are preferably processed in a manner known per se with polymer powders to form pigment pastes in which it is also possible for the novel binder BM to be present.

The novel electrodeposition coating material is prepared from the above-described aqueous dispersion of the binder and the pigment paste, the application viscosity of the electrodeposition coating material generally being established by the addition of deionized water subsequent to the addition of the pigment paste to the aqueous dispersion of the binder. In the case of the unpigmented electrodeposition coating materials which also come within the scope of the invention, the addition of the pigment paste is, of course, omitted.

The nonvolatiles content of the novel aqueous electrodeposition coating materials consists to the extent of from 35 to 100% by weight, preferably from 35 to 90% by weight, of the cathodically depositable binder or of a mixture of cathodically depositable synthetic resins and of the binder BM, to the extent of from 0 to 65% by weight, preferably from 10 to 65% by weight, of crosslinker, and to the extent of from 0 to 60% by weight, preferably from 0 to 35% by weight, of pigments and/or fillers.

The solids content of the novel aqueous electrodeposition coating materials is in general from 5 to 40, preferably 10 to 40, particularly preferably from 20 to 40% by weight, based on the coating material.

The invention additionally relates to a process for coating electrically conductive substrates, in which
(1) the electrically conductive substrate is immersed in the novel aqueous electrodeposition coating material,
(2) the substrate is connected as cathode,
(3) by means of direct current, a film is deposited on the substrate,
(4) the coated substrate is removed from the novel aqueous electrodeposition coating material, and
(5) the deposited coating film is stoved.

In the course of the deposition the applied voltage can be between 2 and 1000 V. Typically, however, voltages of between 50 and 500 V are operated. The current density is in general between about 10 and 100 A/m$^2$. In the course of deposition the current density tends to drop. As soon as the coating film has been deposited on the substrate, the coated substrate is removed from the electrodeposition coating material and rinsed. The deposited coating film is subsequently stoved. The stoving temperatures are commonly from 90 to 200 degrees C, preferably from 150 to 180 degrees C and the period of stoving is in general between 10 and 60 minutes, preferably between 15 and 30 minutes.

Using the novel process it is possible in principle to coat all electrically conductive substrates. Examples of electrically conductive substrates are substrates of metal, such as steel, aluminum, copper and the like.

The invention is illustrated in more detail in the examples which follow. All parts and percentages are by weight unless expressly stated otherwise.

EXAMPLES

Example 1

Preparing the crosslinking agent (V1)

10,462 parts of isomers and oligomers of higher functionality based on 4,4'-diphenylmethane diisocyanate, having an NCO equivalent weight of 135 g/eq (Lupranat® M20S from BASF AG; NCO functionality about 2.7; content of 2,2'- and 2,4'-diphenylmethane diisocyanate below 5%), are charged under nitrogen to a reactor equipped with a stirrer, reflux condenser, internal thermometer and inert gas inlet. 20 parts of dibutyltin dilaurate are added, and 9626 parts of butyldiglycol are added dropwise at a rate such that the product temperature remains below 60 degrees C. Cooling may be necessary. After the end of the addition, the temperature is held at 60 degrees C for 60 minutes more and an NCO equivalent weight of 1120 g/eq is found (based on solids). After dilution in 7737 parts of methyl isobutyl ketone and addition of 24 parts of dibutyltin dilaurate, 867 parts of melted trimethylolpropane are added at a rate such that the temperature of the product does not exceed 100 degrees C. After the end of the addition, the reaction is allowed to continue for 60 minutes more. In the course of subsequent checking, NCO groups can no longer be detected. The batch is cooled to 65 degrees C and is simultaneously diluted with 963 parts of n-butanol and 300 parts of methyl isobutyl ketone. The solids content is 70.1% (1 hour at 130 degrees C).

Example 2
Preparing the Precursor (AV1) of the Amine Component (A1)

The water of reaction from a 70% strength solution of diethylenetriamine in methyl isobutyl ketone is removed azeotropically at from 110 to 140 degrees C. The remaining solution is then diluted with methyl isobutyl ketone until it has an amine equivalent weight of 131 g/eq.

Example 3
Preparing the Aqueous Dispersions D Comprising the Novel binder and the Crosslinker Example 3.1
Preparing the Dispersion D1

5101 parts of the epoxy resin based on bisphenol A, having an epoxy equivalent weight (EEW) of 188 g/eq, together with 1161 parts of bisphenol A, 278 parts of dodecylphenol, 344 parts of p-cresol, 1795 parts of component (BE) (MOWITAL® B 30 T from Hoechst AG: poly (vinyl butyral-co-vinyl alcohol-co-vinyl acetate containing 69 to 71% by weight vinyl butyral, 24 to 26% by weight vinyl alcohol and 3% by weight vinyl acetate) and 966 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 19 parts of N,N-dimethylbenzylamine are added. The reaction mixture is held at this temperature until the EEW has reached a value of 1026 g/eq.

Then 6872 parts of the crosslinker (V1) of Example 1 are added and the temperature is maintained at 100 degrees C.

Half an hour after adding the crosslinker, 174 parts of butylglycol and 881 parts of sec-butanol are added. Immediately thereafter a mixture of 424 parts of the precursor (AV1) of the amine component from Example 2 and 431 parts of methylethanolamine and is added to the reactor and the batch is thermally conditioned to 100 degrees C. After half an hour more, the temperature is raised to 105 degrees C and 132 parts of N,N-dimethylaminopropylamine are added. 45 minutes after the addition of amine, 773 parts of Plastilit® 3060 (propylene glycol compound from BASF AG) and 45 parts of the additive K2000 (polyether from Byk Chemie) are added, the batch is diluted with a mixture of 431 parts of propylene glycol phenyl ether and 173 parts of sec-butanol, and simultaneously is cooled rapidly to 95 degrees C.

After 10 minutes, 14,933 parts of the reaction mixture are transferred to a dispersion vessel. 481 parts of lactic acid (88w strength in water) dissolved in 6964 parts of deionized water are added in portions with stirring. The mixture is subsequently homogenized for 20 minutes before being diluted further with an additional 12,600 parts of deionized water in small portions.

The volatile solvents are removed by distillation in vacuo and are then replaced in equal amounts by deionized water.

The dispersion D1 has the following characteristics:
Solids content: 32.7% (1 hour at 130 degrees C)
Base content: 0.611 milliequivalents/g of solids
Acid content: 0.406 milliequivalents/g of solids
pH: 5.8
Particle size: 68 nm
(mass average from photon correlation spectroscopy)

Example 3.2
Preparing the Dispersion D2

The procedure as for the preparation of the dispersion D1 in Example 3.1 is repeated with the difference that component (B1) is replaced by component (B2) (MOWITAL® B 30 H from Hoechst AG: polyvinyl butyral-co-vinyl alcohol -co-vinyl acetate) containing 75 to 77% by weight vinyl butyral, 20 to 22% by weight vinyl alcohol and 3% by weight polyvinyl acetate).

The dispersion D2 has the following characteristics:
Solids content: 32.5E (1 hour at 130 degrees C)
Base content: 0.632 milliequivalents/g of solids
Acid content: 0.387 milliequivalents/g of solids
pH: 5.9
Particle size: 95 nm Example 3.3
Preparing the Dispersion D3

4955 parts of the epoxy resin based on bisphenol A, having an epoxy equivalent weight (EEW) of 188 g/eq, together with 1128 parts of bisphenol A, 270 parts of dodecylphenol, 334 parts of p-cresol, 2256 parts of MOWITAL® B 30 H from Hoechst AG: (component B2)) and 996 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 19 parts of N,N-dimethylbenzylamine are added. The reaction mixture is held at this temperature until the EEW has reached a value of 1088 g/eq.

Then 6675 parts of the crosslinker (V1) are added and the temperature is maintained at 100 degrees C.

Half an hour after adding the crosslinker, 169 parts of butylglycol and 856 parts of sec-butanol are added. Immediately thereafter a mixture of 411 parts of the precursor (AV1) and 419 parts of methylethanolamine is added to the reactor and the batch is thermally conditioned to 100 degrees C. After half an hour more, the temperature is raised to 105 degrees C and 128 parts of N,N-dimethylaminopropylamine are added.

45 minutes after the addition of amine, 751 parts of Plastilit® 3060 (propylene glycol compound from BASF AG) and 45 parts of the additive K2000 (polyether from Byk Chemie) are added, the batch is diluted with a mixture of 419 parts of propylene glycol phenyl ether and 168 parts of sec-butanol, and simultaneously is cooled rapidly to 95 degrees C.

After 10 minutes, 14,848 parts of the reaction mixture are transferred to a dispersion vessel. 464 parts of lactic acid (88t strength in water) dissolved in 7066 parts of deionized water are added in portions with stirring. The mixture is subsequently homogenized for 20 minutes before being diluted further with an additional 12,600 parts of deionized water in small portions.

The volatile solvents are removed by distillation in vacuo and are then replaced in equal amounts by deionized water.

The dispersion D3 has the following characteristics:
Solids content: 32.6% (1 hour at 130 degrees C)
Base content: 0.611 milliequivalents/g of solids
Acid content: 0.382 milliequivalents/g of solids
pH: 5.8
Particle size: 96 nm Example 3.4
Preparing the Dispersion D4

5239 parts of the epoxy resin based on bisphenol A, having an epoxy equivalent weight (EEW) of 188 g/eq, together with 1193 parts of bisphenol A, 286 parts of dodecylphenol, 353 parts of p-cresol, 1176 parts of MOWI-TAL® B 30 H from Hoechst AG: (component B2)) and 919 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 20 parts of N,N-dimethylbenzylamine are added. The reaction mixture is held at this temperature until the EEW has reached a value of 949 g/eq.

Then 6866 parts of the crosslinker (Vl) are added and the temperature is maintained at 100 degrees C.

Half an hour after adding the crosslinker, 179 parts of butylglycol and 905 parts of sec-butanol are added. Immediately thereafter a mixture of 435 parts of the precursor (AV1) and 443 parts of methylethanolamine is added to the reactor and the batch is thermally conditioned to 100 degrees C. After half an hour more, the temperature is raised to 105 degrees C and 135 parts of N,N-dimethylaminopropylamine are added.

45 minutes after the addition of amine, 930 parts of Plastilit® 3060 (propylene glycol compound from BASF AG) and 44 parts of the additive K2000 (polyether from Byk Chemie) are added, the batch is diluted, with a mixture of 701 parts of propylene glycol phenyl ether and 177 parts of sec-butanol, and simultaneously is cooled rapidly to 95 degrees C.

After 10 minutes, 15,198 parts of the reaction mixture are transferred to a dispersion vessel. 503 parts of lactic acid (88% strength in water) dissolved in 6678 parts of deionized water are added in portions with stirring. The mixture is subsequently homogenized for 20 minutes before being diluted further with an additional 12,600 parts of deionized water in small portions.

The volatile solvents are removed by distillation in vacuo and are then replaced in equal amounts by deionized water.

The dispersion D4 has the following characteristics:
Solids content: 32.0% (1 hour at 130 degrees C)
Base content: 0.621 milliequivalents/g of solids
Acid content: 0.340 milliequivalents/g of solids
pH: 6.0
Particle size: 87 nm Example 3.5
Preparation of the Dispersion D5

4996 parts of the epoxy resin based on bisphenol A, having an epoxy equivalent weight (EEW) of 188 g/eq, together with 1138 parts of bisphenol A, 272 parts of dodecylphenol, 337 parts of p-cresol, 1758 parts of component (B3) (MOWITAL® B 60 H from Hoechst AG: poly (vinyl butyral-co-vinyl alcohol-co-vinyl acetate containing 76 to 78% by weight vinyl butyral, 19 to 21% by weight vinyl alcohol and 3% by weight polyvinyl acetate) and 947 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 19 parts of N,N-dimethylbenzylamine are added. The reaction mixture is held at this temperature until the EEW has reached a value of 1026 g/eq.

Then 6731 parts of the crosslinker (V1) are added and the temperature is maintained at 100 degrees C.

Half an hour after adding the crosslinker, 171 parts of butylglycol and 863 parts of sec-butanol are added. Immediately thereafter a mixture of 415 parts of the precursor (AV1) and 422 parts of methylethanolamine is added to the reactor and the batch is thermally conditioned to 100 degrees C. After half an hour more, the temperature is raised to 105 degrees C and 129 parts of N,N-dimethylaminopropylamine are added.

45 minutes after the addition of amine, 758 parts of Plastilit® 3060 (propylene glycol compound from BASF AG) and 44 parts of the additive K2000 (polyether from Byk Chemie) are added, the batch is diluted with a mixture of 831 parts of propylene glycol phenyl ether and 169 parts of sec-butanol, and simultaneously is cooled rapidly to 95 degrees C.

After 10 minutes, 15,244 parts of the reaction mixture are transferred to a dispersion vessel. 481 parts of lactic acid (880 strength in water) dissolved in 6653 parts of deionized water are added in portions with stirring. The mixture is subsequently homogenized for 20 minutes before being diluted further with an additional 12,600 parts of deionized water in small portions.

The volatile solvents are removed by distillation in vacuo and are then replaced in equal amounts by deionized water.

The dispersion D5 has the following characteristics:
Solids content: 32.7% (1 hour at 130 degrees C)
Base content: 0.625 milliequivalents/g of solids
Acid content: 0.402 milliequivalents/g of solids
pH: 5.9
Particle size: 189 nm Example 3.6
Preparation of the Dispersion D6

5503 parts of the epoxy resin based on bisphenol A, having an epoxy equivalent weight (EEW) of 188 g/eq, together with 1253 parts of bisphenol A, 300 parts of dodecylphenol, 371 parts of p-cresol, 747 parts of component (B4) (MOWITAL® B 20 H from Hoechst AG: polytvinyl butyral-co-vinyl alcohol-co-vinyl acetate containing 75 to 77% by weight vinyl butyral, 20 to 22% by weight vinyl alcohol and 3% by weight polyvinyl acetate) and 664 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 21 parts of N,N-dimethylbenzylamine are added. The reaction mixture is held at this temperature until the EEW has reached a value of 896 g/eq.

Then 7407 parts of the crosslinker (VI) are added and the temperature is maintained at 100 degrees C.

Half an hour after adding the crosslinker, 188 parts of butylglycol and 951 parts of sec-butanol are added. Immediately thereafter a mixture of 430 parts of the precursor (AV1) and 465 parts of methylethanolamine is added to the reactor and the batch is thermally conditioned to 100 degrees C. After half an hour more, the temperature is raised to 105 degrees C and 142 parts of N,N-dimethylaminopropylamine are added.

45 minutes after the addition of amine, 834 parts of Plastilit® 3060 (propylene glycol compound from BASF AG) and 75 parts of the additive K2000 (polyether from Byk Chemie) are added, the batch is diluted with a mixture of 465 parts of propylene glycol phenyl ether and 186 parts of sec-butanol, and simultaneously is cooled rapidly to 95 degrees C.

After 10 minutes, 14,926 parts of the reaction mixture are transferred to a dispersion vessel. 491 parts of lactic acid (88% strength in water) dissolved in 6961 parts of deionized water are added in portions with stirring. The mixture is subsequently homogenized for 20 minutes before being diluted further with an additional 12,600 parts of deionized water in small portions.

The volatile solvents are removed by distillation in vacuo and are then replaced in equal amounts by deionized water.

The dispersion D6 has the following characteristics:
Solids content: 31.8% (1 hour at 130 degrees C)
Base content: 0.682 milliequivalents/g of solids
Acid content: 0.346 milliequivalents/g of solids
pH: 6.1
Particle size: 77 nm Example 3.7
Preparing the Dispersion D7

5504 parts of the epoxy resin based on bisphenol A, having an epoxy equivalent weight (EEW) of 188 g/eq, together with 1253 parts of bisphenol A, 300 parts of dodecylphenol, 371 parts of p-cresol, 1117 parts of MOWITAL B 30 H® from Hoechst AG: (component B2)) and 952 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 20 parts of N,N-dimethylbenzylamine are added. The reaction mixture is held at this temperature until the EEW has reached a value of 936 g/eq.

Then 6311 parts of the crosslinker (Vi) are added and the temperature is maintained at 100 degrees C.

Half an hour after adding the crosslinker, 188 parts of butylglycol and 951 parts of sec-butanol are added.

Immediately thereafter a mixture of 484 parts of the precursor (AV1) and 465 parts of methylethanolamine is added to the reactor and the batch is thermally conditioned to 100 degrees C. After half an hour more, the temperature is raised to 105 degrees C and 142 parts of N,N-dimethylaminopropylamine are added.

45 minutes after the addition of amine, 787 parts of Plastilit® 3060 (propylene glycol compound from BASF AG) and 73 parts of the additive K2000 (polyether from Byk Chemie) are added, the batch is diluted with a mixture of 466 parts of propylene glycol phenyl ether and 186 parts of sec-butanol, 430 parts of dibutyltin dilaurate are added to the reactor, and simultaneously the batch is cooled rapidly to 95 degrees C.

After 10 minutes, 14,926 parts of the reaction mixture are transferred to a dispersion vessel. 455 parts of lactic acid (88% strength in water) dissolved in 6998 parts of deionized water are added in portions with stirring. The mixture is subsequently homogenized for 20 minutes before being diluted further with an additional 12,600 parts of deionized water in small portions.

The volatile solvents are removed by distillation in vacuo and are then replaced in equal amounts by deionized water.

The dispersion D7 has the following characteristics:
Solids content: 32.9k (1 hour at 130 degrees C)
Base content: 0.753 milliequivalents/g of solids
Acid content: 0.475 milliequivalents/g of solids
pH: 6.0
Particle size: 158 nm Example 4
Preparing the Aqueous Dispersions DV Comprising the Prior Art Binders and the Crosslinker Example 4.1
Preparing the Dispersion DV1

5797 parts of the epoxy resin based on bisphenol A, having an epoxy equivalent weight (EEW) of 188 g/eq, together with 1320 parts of bisphenol A, 316 parts of dodecylphenol, 391 parts of p-cresol, and 413 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 22 parts of N,N-dimethylbenzylamine are added. The reaction mixture is held at this temperature until the EEW has reached a value of 814 g/eq.

Then 7810 parts of the crosslinker (V1) of Example 1 are added and the temperature is maintained at 100 degrees C.

Half an hour after adding the crosslinker, 198 parts of butylglycol and 1002 parts of sec-butanol are added.

Immediately thereafter a mixture of 481 parts of the precursor (AV1) from Example 2 and 490 parts of methylethanolamine is added to the reactor and the batch is thermally conditioned to 100 degrees C. After half an hour more, the temperature is raised to 105 degrees C and 150 parts of N,N-dimethylaminopropylamine are added.

45 minutes after the addition of amine, 879 parts of Plastilit® 3060 (propylene glycol compound from BASF AG) and 45 parts of the additive K2000 (polyether from Byk Chemie) are added, the batch is diluted with a mixture of 490 parts of propylene glycol phenyl ether and 196 parts of sec-butanol, and simultaneously is cooled rapidly to 95 degrees C.

After 10 minutes, 14,930 parts of the reaction mixture are transferred to a dispersion vessel. 455 parts of lactic acid (88% strength in water) dissolved in 6993 parts of deionized water are added in portions with stirring. The mixture is subsequently homogenized for 20 minutes before being diluted further with an additional 12,600 parts of deionized water in small portions. The volatile solvents are removed by distillation in vacuo and are then replaced in equal amounts by deionized water.

The dispersion DV1 has the following characteristics:
Solids content: 31.9% (1 hour at 130 degrees C)
Base content: 0.69 milliequivalents/g of solids
Acid content: 0.32 milliequivalents/g of solids
pH: 6.2
Particle size: 113 nm Example 4.2
Preparing the Dispersion DV2

6020 parts of the epoxy resin based on bisphenol A, having an epoxy equivalent weight (EEW) of 188 g/eq, together with 1371 parts of bisphenol A, 328 parts of dodecylphenol, 406 parts of p-cresol, and 429 parts of xylene are heated under nitrogen to 125 degrees C in a reactor equipped with a stirrer, reflux condenser, internal thermometer and inert gas inlet and are stirred for 10 minutes. The mixture is then heated to 130 degrees C and 22 parts of N,N-dimethylbenzylamine are added. The reaction mixture is held at this temperature until the EEW has reached a value of 814 g/eq.

Then 6903 parts of the crosslinker (V1) are added and the temperature is maintained at 100 degrees C.

Half an hour after adding the crosslinker, 206 parts of butylglycol and 1040 parts of sec-butanol are added. Immediately thereafter a mixture of 529 parts of the precursor (AV1) and 509 parts of methylethanolamine is added to the reactor and the batch is thermally conditioned to 100 degrees C. After half an hour more, the temperature is raised to 105 degrees C and 155 parts of N,N-dimethylaminopropylamine are added.

45 minutes after the addition of amine, 861 parts of Plastilite® 3060 (propylene glycol compound from BASF AG) and 73 parts of the additive K2000 (polyether from Byk Chemie) are added, the batch is diluted with a mixture of 509 parts of propylene glycol phenyl ether and 204 parts of sec-butanol, 435 parts of dibutyltin dilaurate are added to the reactor and simultaneously the batch is cooled rapidly to 95 degrees C.

After 10 minutes, 14,784 parts of the reaction mixture are transferred to a dispersion vessel. 474 parts of lactic acid (88% strength in water) dissolved in 7120 parts of deionized water are added in portions with stirring. The mixture is subsequently homogenized for 20 minutes before being diluted further with an additional 12,600 parts of deionized water in small portions.

The volatile solvents are removed by distillation in vacuo and are then replaced in equal amounts by deionized water.

The dispersion DV2 has the following characteristics:
Solids content: 32.6% (1 hour at 130 degrees C)
Base content: 0.783 milliequivalents/g of solids
Acid content: 0.473 milliequivalents/g of solids
pH: 6.3
Particle size: 102 nm

Example 5
Preparing Pigment Pastes PP

Example 5.1
Preparing a Grinding Resin Solution RL

In accordance with EP 0 505 445 B1, Example 1.3, an organic-aqueous grinding resin solution RL is prepared by reacting, in the first stage, 2598 parts of bisphenol A diglycidyl ether (epoxy equivalent weight (EEW): 188 g/eq), 787 parts of bisphenol A, 603 parts of dodecylphenol and 206 parts of butylglycol in the presence of 4 parts of triphenylphosphine at 130° C. to an EEW of 865 g/eq. While the reaction batch is cooling, it is diluted with 849 parts of butylglycol and 1534 parts of D.E.R. 732 (polypropylene glycol diglycidyl ether from DOW Chemical) and is reacted further at 90° C. with 266 parts of 2,2'-aminoethoxyethanol and 212 parts of N,N-dimethylaminopropylamine. After 2 hours the viscosity of the resin solution is constant (5.3 dPa s; 40% strength in Solvenon® PM (methoxy-propanol from BASF AG); plate-cone viscometer at 23° C.). It is diluted with 1512 parts of butylglycol and the base groups are partially neutralized with 201 parts of glacial acetic acid; the resulting solution is then diluted further with 1228 parts of deionized water and discharged. In this way a 60% strength aqueous-organic grinding resin solution RL is obtained whose 10% strength dilution has a pH of 6.0.

The grinding resin solution RL is employed subsequently for paste preparations.

Example 5.2
Preparing a Gray Pigment Paste PP1

For this purpose# first 280 parts of water and 250 parts of the above-described grinding resin solution are mixed together. Then 5 parts of carbon black, 35 parts of basic lead silicate BSWL® 202 (from Chemag; Germany), 90 parts of extender HEWP R (English China Clay Int., Great Britain), 315 parts of titanium dioxide TI-PURE® 900 (from DuPont, USA), 5 parts of Bentone R EW (from Rheox, Germany) and 20 parts of di-n-butyltin oxide are added. The mixture is predispersed for 30 minutes in a high-speed dissolver stirrer. The mixture is subsequently dispersed in a small-scale laboratory mill (motor mini mill, from Eiger Engineering Ltd., Great Britain) for from 1 to 1.5 hours down to a Hegmann fineness of less than or equal to 12 and is adjusted with further water to processing viscosity. The pigment paste PP1 is obtained which is stable with respect to separation.

Example 5.3
Preparing a Black Pigment Paste PP2

In accordance with EP 0 505 445 B1, Example 7, first 407 parts of water, 170 parts of the above-described grinding resin solution RL and 4 parts of acetic acid (90% strength) are mixed together. Then 21 parts of carbon black, 42 parts of basic lead silicate BSWL® 202 (from Chemag; Germany), 341 parts of extender blanc fixe micro (from Sachtleben Chemie; Germany), and 15 parts of di-n-butyltin oxide are added. The mixture is predispersed for 30 minutes in a high-speed dissolver stirrer. The mixture is subsequently dispersed in a small-scale laboratory mill (motor mini mill, from Eiger Engineering Ltd., Great Britain) for from 1 to 1.5 hours down to a Hegmann fineness of less than or equal to 12 and is adjusted with further water to processing viscosity.

The pigment paste PP2 is obtained which is stable with respect to separation.

Example 6
Preparing the Novel Electrodeposition Coating Materials

Example 6.1
Preparing Pigmented Electrodeposition Paints

Example 6.1.1
Preparing Gray Electrodeposition Paints

Using dispersions according to Examples 3 and 4, the following gray electrodeposition paints G0 to G5 are prepared, consisting of mixtures of in each case
(G0) 2606 parts of the dispersion DV1 (Example 4.1),
(G1) 2543 parts of the dispersion D1 (Example 3.1),
(G2) 2558 parts of the dispersion D2 (Example 3.2),
(G3) 2550 parts of the dispersion D3 (Example 3.3),
(G4) 2543 parts of the dispersion D5 (Example :3.5),
(G5) 2614 parts of the dispersion D6 (Example 3.6)
and 1500 parts of deionized water and also 25 parts of 10% strength aqueous lactic acid solution.

646 parts of the gray pigment paste PP1 from Example 5.2 are added with stirring to the resulting mixtures. The electrodeposition paint thus obtained is made up to 5000 parts with deionized water.

Example 6.1.2
Preparing Black Electrodeposition Paints

Using dispersions of Examples 3 and 4, the following black electrodeposition coating baths S0 and S1 are prepared, consisting of mixtures of in each case
(S0) 2606 parts of the dispersion DV1 (Example 4.1),
(S1) 2598 parts of the dispersion D4 (Example 3.4)
and 1500 parts of deionized water and also 25 parts of 10% strength aqueous lactic acid solution. 720 parts of the black pigment paste PP2 from Example 5.3 are added with stirring to the resulting mixtures. The electrodeposition paint thus obtained is made up to 5000 parts with deionized water.

Example 6.2
Preparing Unpigmented Electrodeposition Coating Materials (Clearcoats)

Using dispersions from Examples 3 and 4, the following unpigmented electrodeposition coating baths K0 and K1 are prepared, consisting of mixtures of in each case:
(K0) 2301 parts of the dispersion DV2 (Example 4.2) and 2699 parts of deionized water,
(K1) 2280 parts of the dispersion D7 (Example 3.7) and 2720 parts of deionized water.

Example 7
Depositing the Electrodeposition Coating Materials

After aging for 5 days at room temperature, cathodic deposition is carried out on a steel test panel connected as cathode with a series resistance of 150 ohms.

This is done using steel test panels and zinc-phosphatized steel test panels from Chemetall (Bo26 W OC) which have been rinsed with water. The deposition time is 2 minutes at a bath temperature of 30° C. The deposition voltage was chosen so as to result in a film thickness of the stoved coating film of about 20 micrometers.

The deposited coating film is rinsed with deionized water and stoved at 180° C. for 20 minutes. The stoved coating films obtained in this way were tested. The test results are given in Tables 1 and 2.

TABLE 1

Test results of gray and black electrodeposition coating baths

| Electrodeposition coating bath | G0 | G1 | G2 | G3 | G4 | S0 | S1 |
|---|---|---|---|---|---|---|---|
| Dispersion | DV1 | D1 | D2 | D3 | D5 | DV1 | D4 |
| Comparison examples without polyvinyl acetal copolymer | X | | | | | X | |
| Zinc-phosphatized steel test panels rinsed with water[(0)] | | | | | | | |
| Film thickness (dry film) in μm at voltage in V 10 cycles | 20.2 | 21.8 | 18.5 | 23.6 | 19.2 | 20.9 | 20.2 |
| climate test[(1)] | 300 | 320 | 310 | 350 | 320 | 300 | 300 |
| Scribe creep in mm[(2)] | 2.4 | 2.1 | 2.1 | 2.0 | 2.2 | 2.8 | 2.3 |
| Surface rust[(3)] | 1 | 1 | 1 | 1 | 1 | 1 | 1 |
| Edge rust[(4)] | 4 | 1 | 1 | 1 | 1 | 3 | 1 |
| Electrical quality index[(5)] in % | 5 | 59 | 89 | 99 | 100 | 4 | 97 |
| Evenness[(6)] | 2 | 3 | 3 | 3 | 3 | 2 | 3 |
| Bright steel test panels | | | | | | | |
| Film thickness (dry film) in μm at voltage in V | 20.7 | 20.2 | 18.0 | 18.2 | 24.3 | 20.9 | 20.8 |
| Salt spray exposure for 360 h[(7)] | 210 | 240 | 200 | 220 | 200 | 220 | 200 |
| Scribe creep in mm[(2)] | 0.5 | 0.7 | 0.5 | 0.5 | 0.7 | 0.8 | 0.6 |
| Edge rust[(4)] | 5 | 2 | 1 | 1 | 1 | 5 | 1 |

TABLE 2

Test results of gray and unpigmented electrodeposition coating baths

| Electrodeposition coating bath | G0 | G5 | K0 | K1 |
|---|---|---|---|---|
| Dispersion | DV1 | D6 | DV2 | D7 |
| Comparison examples without polyvinyl acetal copolymer | X | | X | |
| Zinc-phosphatized steel test panels rinsed with water[(0)] | | | | (*) |
| Film thickness (dry film) in μm | 20.2 | 21.8 | 22.0 | 20.0 |
| at voltage in V | 300 | 320 | 400 | 425 |
| Evenness[(6)] | 2 | 2 | 1 | 1 |
| Reverse impact in inch pound[(8)] | 20 | 40 | 60 | 160 |
| MB ball shot at −20° C.[(9)] | | | | |
| Flaking in mm$^2$ [(9)] | 7.5 | 6.8 | 6.2 | 6.0 |
| Degree of rust (rating 0–5)[(9, 10)] | 4 | 1 | 4 | 1 |
| Ford throwing power[(11)] | | | | |
| Exterior film thickness in μm | 21.0 | 22.1 | 24.0 | 18.4 |
| Extent of reach in cm | 22.9 | 24.7 | 24.8 | 26.0 |
| Corrosion line in cm | 21.4 | 23.0 | 19.5 | 26.0 |

(*) Deposition at 31° C.

Key to Tables 1 and 2:

(0): Zinc-phosphatized steel test panels, rinsed with water: B026 W60 OC (from Chemetall), water rinse pH=6.0
(1): 10 cycles climate test:
(2): Creep [mm]=(overall creep [mm]–thickness of scribe mark [mm]): 2
(3): Visual assessment: 0=best value; 5=poorest value
(4): Visual assessment: 0=best value; 5=poorest value
(5): The index is determined by applying a voltage of 50 to 1000 V to the coated edge and determining the insulating effect at the point of breakdown. The higher the electrical quality index, the higher the insulating effect. The higher the insulating effect, the better the coating of the edge with an electrodeposition film.
(6): Visual assessment: 1=best value; 5=poorest value
(7): Determined in accordance with ASTM B 117
(8): Determined in accordance with ASTM D 2794 (after aging at 80 degrees C)
(9) In accordance with Mercedes Benz Specification LVP 5200.40701: System: polyurethane surfacer/metallic aqueous basecoat/1-component high-solids clearcoat
(10): Visual assessment: 0=best value; 5=poorest value
(11): Ford throwing power in accordance with F/02-EU BI 20-2

What is claimed is:

1. A process for preparing a binder for coatings compositions, comprising steps of:

providing:
(A) from 1 to 99.9% by weight of an epoxy resin having one or more epoxy groups, and
(B) from 0.1 to 99% by weight of a copolymer of vinyl acetate and at least one further component selected from the group consisting of vinyl alcohol, alkylvinyl acetal, ethylene, and mixtures thereof, mixing components (A) and (B) intensively in a solvent or in a melt of (A) and (B) in the presence of at least one epoxy ring-opening catalyst so that (A) reacts with (B) to provide a mixture of (A) and (B), introducing ionic groups into epoxy resin (A) by partially or completely reacting the epoxy groups which have not reacted with an amino- or coarboxyl-containing compound which are converted to ionic groups by neutralization, and dispersing the mixture of (A) and (B) in water.

2. The process of claim 1, wherein components (A) and (B) are mixed at temperatures of between 15 and 250 degrees C.

3. The process of claim 1, wherein the epoxy resin (A) has an epoxide equivalent weight of between 170 and 10,000 g/eq.

4. The process of claim 1, wherein the epoxy resin (A) is selected from the group consisting of a polyglycidyl ether of a cyclic polyol, the reaction product of a polyglycidyl ether of a polyphenol with aliphatic hydroxy compounds, the reaction product of a polyglycidyl ether of a polyphenol with alicyclic hydroxy compounds, and mixtures thereof.

5. The process of claim 1, wherein the copolymer (B) is composed of: (b1) from 0 to 5000 monomer units of alkylvinyl acetal of the formula I

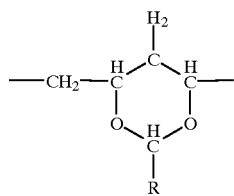

where R is a $C_1$ to $C_{11}$-alkyl radical, (b2) from 3 to 6500 monomer units of vinyl acetate, (b3) from 0 to 12,500 monomer units of vinyl alcohol and (b4) from 0 to 20,000 monomer units of ethylene.

6. The process of claim 5, wherein the copolymer (B) is composed of:

(b1) from 3 to 4600 monomer units of vinyl acetal of the formula I, (b2) from 3 to 6200 monomer units of vinyl acetate and (b3) from 0 to 12,100 monomer units of vinyl alcohol.

7. The process of claim 5, wherein the copolymer (B) is composed of:

(b2) from 3 to 6200 monomer units of vinyl acetate, (b3) from 0 to 12,100 monomer units of vinyl alcohol, and (b3) from 3 to 18,000 monomer units of ethylene.

8. An electrodeposition coating material comprising the binder prepared by the process of claim 1.

9. The electrodeposition coating material of claim 8, further comprising a member selected from the group consisting of pigment colorants, fillers, and mixtures thereof.

10. A process for coating electrically conductive substrates, comprising:

(1) immersing an electrically conductive substrate in an aqueous electrodeposition coating material of claim 8, (2) connecting the substrate as cathode, (3) depositing a film on the substrate by means of direct current, (4) removing the coated substrate from the electrodeposition coating material, and (5) staving the deposited coating film.

11. A process for producing multicoat paint systems on an electrically conducting substrate comprising providing the electrically conducting coated substrate of claim 10, and applying thereto, one or more coating compositions.

12. The process of claim 11, comprising applying a surfacer to the electrically conducting coated substrate to provide a coated film, subsequently applying at least one topcoat and/or clearcoat, and baking the first coated film either before or after the application of the at least one topcoat and/or clearcoat.

13. The process of claim 2, wherein components (A) and (B) are mixed at temperatures of between 70 and 200 degrees C.

14. The process of claim 4, wherein the polyglycidyl ether of a cyclic polyol is a polyglycidyl ether of a polyphenol.

* * * * *

UNITED STATES PATENT AND TRADEMARK OFFICE
CERTIFICATE OF CORRECTION

PATENT NO. : 6,235,812 B2
DATED : May 22, 2001
INVENTOR(S) : Reuter et al.

It is certified that error appears in the above-identified patent and that said Letters Patent is hereby corrected as shown below:

Column 22,
Line 11, after "(5)", and before "the deposited ", please delete "staving", and insert -- stoving --

Signed and Sealed this

Third Day of September, 2002

Attest:

Attesting Officer

JAMES E. ROGAN
Director of the United States Patent and Trademark Office